United States Patent
Hoge

(10) Patent No.: US 8,912,259 B2
(45) Date of Patent: Dec. 16, 2014

(54) FORMULATED BENZOXAZINE BASED SYSTEM FOR TRANSPORTATION APPLICATIONS

(75) Inventor: James Hoge, Conroe, TX (US)

(73) Assignee: Huntsman Advanced Materials Americas LLC, The Woodlands, TX (US)

(*) Notice: Subject to any disclaimer, the term of this patent is extended or adjusted under 35 U.S.C. 154(b) by 0 days.

(21) Appl. No.: 13/816,952

(22) PCT Filed: Aug. 11, 2011

(86) PCT No.: PCT/US2011/047357
§ 371 (c)(1),
(2), (4) Date: Feb. 14, 2013

(87) PCT Pub. No.: WO2012/027119
PCT Pub. Date: Mar. 1, 2012

(65) Prior Publication Data
US 2013/0143457 A1    Jun. 6, 2013

Related U.S. Application Data

(60) Provisional application No. 61/376,779, filed on Aug. 25, 2010.

(51) Int. Cl.
C08L 79/04 (2006.01)
C08L 63/00 (2006.01)
C08K 5/07 (2006.01)

(52) U.S. Cl.
USPC ............ 524/104; 524/361; 524/607; 528/355

(58) Field of Classification Search
CPC ............ C08L 79/04; C08L 93/00; C08K 5/07
USPC .................. 524/236, 104, 361, 607; 528/355
See application file for complete search history.

(56) References Cited

U.S. PATENT DOCUMENTS

| | | | |
|---|---|---|---|
| 6,743,852 B2 | 6/2004 | Dershem et al. | |
| 2005/0181215 A1 | 8/2005 | Suzuki et al. | |
| 2008/0302471 A1 | 12/2008 | Tsuei | |
| 2010/0204433 A1 | 8/2010 | Eguchi et al. | |

FOREIGN PATENT DOCUMENTS

| WO | 2006/035021 | 4/2006 |
|---|---|---|
| WO | WO 2010/018008 | 2/2010 |

OTHER PUBLICATIONS

Composites Europe 2009. Oct. 12, 2009.*

* cited by examiner

*Primary Examiner* — John Uselding

(57) ABSTRACT

The present disclosure provides a halogen-free thermosetting composition including a benzoxazine compound, a monobenzoxazine monomer, and a naphthalene epoxy. The halogen-free thermosetting composition is especially suited for use in aerospace, automobile, rail and marine applications.

9 Claims, No Drawings

FORMULATED BENZOXAZINE BASED SYSTEM FOR TRANSPORTATION APPLICATIONS

CROSS-REFERENCE TO RELATED APPLICATION

This application claims priority to U.S. Pat. App. Ser. No. 61/376,779. filed Aug. 25, 2010, which is incorporated herein by reference.

STATEMENT REGARDING FEDERALLY SPONSORED RESEARCH OR DEVELOPMENT

Not Applicable.

FIELD OF INVENTION

This disclosure relates to a benzoxazine based halogen-free thermosetting composition which may be cured at low temperatures to form inflammable polymeric networks exhibiting enhanced mechanical and thermal properties. The benzoxazine based halogen-free thermosetting compositions may be utilized in methods for the production of composite articles useful in various applications, such as in aerospace, automotive, rail and marine applications.

BACKGROUND OF THE INVENTION

Composite articles are typically composed of two primary components: a continuous resin matrix, and reinforcing fibers. Such composite articles are often required to perform in demanding environments, like aerospace and automotive applications, and therefore their physical and thermal limits and characteristics are of critical importance.

Phenolic resins are well known for use as a resin in the production of composite articles because of their excellent fire, smoke and toxicity (FST) properties, good chemical resistance, moderately low needed cure temperatures/times, and acceptable physical properties. However, they are also known to be quite difficult to process due to their high viscosities, and high porosity content. Also toxicity issues can be of concern.

Recently, benzoxazine compounds and compositions thereof have been employed to produce prepregs, laminates and structural composites via impregnating and infusion processes (see, for e.g. U.S. Pat. No. 4,607,091; U.S. Pat. No. 5,200,452; U.S. Pat. No. 6,207,786; WO 2005/019291; WO 2006/035021; WO2007/064801; and WO 2010/031826). These compounds and compositions exhibit improved handling and curing properties, such as, low viscosity, no volatile release during cure, near zero shrinkage, high glass transition temperature, excellent chemical and electrical resistance and flame retardancy. However, these benzoxazine compounds are typically latent materials; therefore, they require high temperatures to gel and cure. It would therefore be desirable to develop an alternative benzoxazine based composition that can be cured relatively quickly, at temperatures lower than those used conventionally, yet still exhibit excellent handling and curing properties so that it may be used in forming composite articles employed in demanding environments.

SUMMARY OF THE INVENTION

One aspect of the present disclosure provides a halogen-free thermosetting composition containing:

(a) a benzoxazine compound of the formula (I)

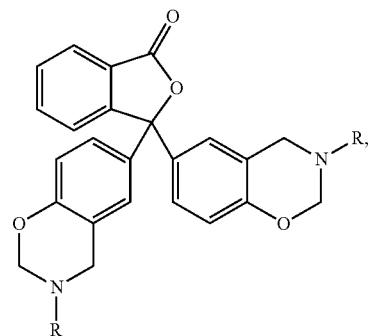

(I)

where each R is, independently from one another, allyl, unsubstituted or substituted phenyl, unsubstituted or substituted $C_1$-$C_8$ alkyl or unsubstituted or substituted $C_3$-$C_8$ cycloalkyl;

(b) a monobenzoxazine monomer of the formula (II)

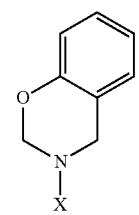

(II)

where X is an aliphatic or aromatic group; and
(c) a naphthalene epoxy.

The present disclosure also provides methods for producing composite articles utilizing the halogen-free thermosetting composition as well as composite articles made from such methods.

DETAILED DESCRIPTION OF THE INVENTION

In general, the present disclosure provides a halogen-free thermosetting composition including: (a) a benzoxazine compound; (b) a monobenzoxazine monomer; and (c) a naphthalene epoxy. It has been surprisingly found that the halogen-free thermosetting composition exhibits improved reactivity at temperatures lower than those used during the curing of conventional benzoxazine based compositions. In addition, it has been surprisingly found that the halogen-free thermosetting composition of the present disclosure exhibits an unusually high latency and storage stability. The composition may therefore be stored in one container and shipped to users to provide for ease of use as well as economic advantages. In addition, the halogen-free thermosetting composition, upon curing, provides a cured product exhibiting an excellent balance of mechanical and chemical properties including, for example, a high glass transition temperature ($T_g$), decomposition temperature ($T_d$), high tensile strength, low coefficient of thermal expansion, and good flexibility and FST properties. Accordingly, it may be used in a variety of applications which require a composition to exhibit a high glass transition temperature and peel strength, and enhanced tack and drape when cured at relatively low temperatures. The halogen-free thermosetting composition is particularly suitable in various transportation applications, for example, aerospace, automotive, rail and marine applications.

Benzoxazine Compound

The halogen-free thermosetting composition of the present disclosure includes from about 5-50 parts by weight, preferably from about 10-40 parts by weight, and more preferably from about 15-30 parts by weight, per 100 parts by weight of the halogen-free thermosetting composition, of a benzoxazine compound of the formula (I)

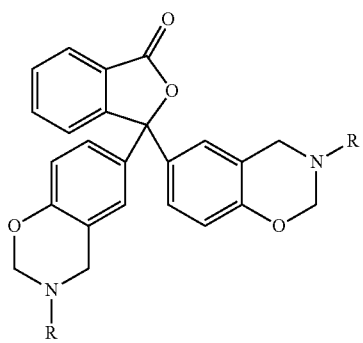

(I)

where each R is, independently from one another, allyl, unsubstituted or substituted phenyl, unsubstituted or substituted $C_1$-$C_8$ alkyl or unsubstituted or substituted $C_3$-$C_8$ cycloalkyl. Suitable substituents on the R-groups include amino, $C_1$-$C_4$ alkyl and allyl. One to four substituents may be present on the R-group. Preferably, the R-groups are the same and more preferably are phenyl.

The benzoxazine compounds are available commercially from several sources including, but not limited to, Huntsman Advanced Materials Americas LLC. Alternatively, the benzoxazine compounds may be obtained by reacting phenolphthalein with an aldehyde, for example, formaldehyde, and a primary amine, under conditions in which water is removed. The molar ratio of phenolphthalein to aldehyde may be from about 1:3 to 1:10, preferably from about 1:4: to 1:7, and more preferably from about 1:4.5 to 1:5. The molar ratio of phenolphthalein to primary amine reactant may be from about 1:1 to 1:3, preferably from about 1:1.4 to 1:2.5, and more preferably from about 1:2.1 to 1:2.2. Examples of primary amines include: aromatic mono- or di-amines, aliphatic amines, cycloaliphatic amines and heterocyclic monoamines; for example, aniline, o-, m- and p-phenylene diamine, benzidine, 4,4'-diaminodiphenyl methane, cyclohexylamine, butylamine, methylamine, hexylamine, allylamine, furfurylamine ethylenediamine, and propylenediamine. The amines may, in their respective carbon part, be substituted by $C_1$-$C_8$ alkyl or allyl. Preferred primary amines are according to the general formula $R_aNH2$, wherein $R_a$ is allyl, unsubstituted or substituted phenyl, unsubstituted or substituted $C_1$-$C_8$ alkyl or unsubstituted or substituted $C_3$-$C_8$ cycloalkyl. Suitable substituents on the $R_a$ group include amino, $C_1$-$C_4$ alkyl and allyl. Typically, one to four substituents may be present on the $R_a$ group. Preferably $R_a$ is phenyl.

Monobenzoxazine Monomer

The halogen-free thermosetting composition of the present disclosure also includes from about 5-50 parts by weight, preferably from about 15-45 parts by weight, and more preferably from about 20-40 parts by weight, per 100 parts by weight of the halogen-free thermosetting composition of a monobenzoxazine monomer. As used herein, the term "monobenzoxazine monomer" refers to a monomer having one benzoxazine group per molecule.

The monobenzoxazine monomer may be represented by the general formula (II)

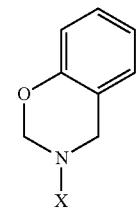

(II)

where X is an aliphatic or aromatic group. According to one embodiment, X is allyl, unsubstituted or substituted phenyl, unsubstituted or substituted $C_1$-$C_8$ alkyl group, or unsubstituted or substituted $C_3$-$C_8$ cycloalkyl group. Suitable substituents on the X-group include amino, $C_1$-$C_4$ alkyl and allyl. Typically, one to four substituents may be present in the substituted X-groups. Preferably X is phenyl.

The monobenzoxazine monomer may be obtained by the reaction of a monohydric phenol compound, an aldehyde and a primary amine under removal of water. The molar ratio of monohydric phenol compound to aldehyde may be from about 1:2 to about 1:2.4, preferably from about 1:2.2 to about 1:2.35, and the molar ratio of phenol compound to primary amine reactant may be from about 1:1.

The monohydric phenol compound may have from 6 to 12 carbon atoms, more preferably 6 carbon atoms, and may be substituted or unsubstituted. Preferably, a substituent, if present, is in the meta position. Examples of the monohydric phenol compound include phenol, m- and p-cresol, m- and p-ethylphenol, m- and p-isopropylphenol, m- and p-methoxyphenol, m- and p-ethoxyphenol, m- and p-isopropyloxyphenol, m- and p-chlorophenol, 1- and 2-naphthol and mixtures thereof.

The aldehyde may have from 1 to 6 carbon atoms. Preferably, the aldehyde is formaldehyde, available either as a solution in water or as paraformaldehyde which breaks down into formaldehyde.

Examples of primary amines include those mentioned above, for example: aromatic mono- or di-amines, aliphatic amines, cycloaliphatic amines and heterocyclic monoamines; for example, aniline, o-, m- and p-phenylene diamine, benzidine, 4,4'-diaminodiphenyl methane, cyclohexylamine, butylamine, methylamine, hexylamine, allylamine, furfurylamine ethylenediamine, and propylenediamine. The amines may, in their respective carbon part, be substituted by $C_1$-$C_8$ alkyl or allyl. Preferred primary amines are according to the general formula $R_bNH_2$, where $R_b$ is allyl, unsubstituted or substituted phenyl, unsubstituted or substituted $C_1$-$C_8$ alkyl or unsubstituted or substituted $C_3$-$C_8$ cycloalkyl. Suitable substituents on the $R_b$ group include amino, $C_1$-$C_4$ alkyl and allyl. Typically, one to four substituents may be present on the substituted $R_b$ groups. Preferably $R_b$ is phenyl.

The reaction time can vary widely with reactant concentration, reactivity and temperature. For example, reaction times may vary from a few minutes for solventless reactions to a few hours, for example 2 hours to 10 hours, for diluted reactions. If a water-based solution of formaldehyde is used as the aldehyde, then a water miscible organic solvent may be used. If one or more reactants are liquid, it may be used to dissolve the other reactant(s). If all of the reactants are solid, they may be first premixed and then melted or first melted and then premixed. The temperature of the reaction may be determined by routine experimentation by noting the formation of monobenzoxazine and less desired products and then optimizing temperature and time for the desirable product. According to one embodiment, the reaction temperature may range from about 0° C.-250° C., preferably from about 50° C.-150° C., and more preferably from about 80° C.-120° C. The monobenzoxazine synthesis reaction may be conducted at atmospheric pressure or at pressures up to about 100 psi.

According to another embodiment, the reaction may be carried out in the presence of an organic solvent. The organic solvent may be an aromatic solvent, for example toluene or xylene, dioxane, a ketone, for example methyl-isobutylketone, or an alcohol, for example isopropanol, sec-butanol or amyl alcohol. The organic solvent may also be a mixture of organic solvents.

Naphthalene Epoxy

The halogen-free thermosetting composition of the present disclosure also includes from about 1-50 parts by weight, preferably from about 5-45 parts by weight, and more preferably from about 10-20 parts by weight, per 100 parts by weight of the halogen-free thermosetting composition, of a naphthalene epoxy.

The naphthalene epoxy may be any compound having at least one naphthalene ring with at least one epoxy group substituted thereupon. The naphthalene ring may include more than one epoxy group, with two or three epoxy groups being preferred. The epoxy groups may be bonded to the naphthalene ring at any suitable position in any combination. In another embodiment, the naphthalene ring may also have one or more non-epoxy substituents bonded at any of the non-epoxy substituted sites. The non-epoxy substituents may be, but are not limited to, hydrogen, hydroxyl, alkyl, alkenyl, alkynyl, alkoxyl, aryl, aryloxyl, aralkyloxyl, aralkyl, halo, nitro or cyano radicals. The substituents may be straight, branched, cyclic or polycyclic substituents. In addition, the substituents may be the same or independently selected.

Thus, in one embodiment, the naphthalene epoxy may be formed from a monomer unit comprising a naphthalene ring with at least one epoxy group substituted thereupon. The naphthalene epoxy may be based on a monomer unit comprising more than one epoxy group and therefore di-, tri-, and tetra-functional epoxy monomers may be selected in any combination. Suitable naphthalene epoxies may include those derived from dihydroxynaphthalene, trihydroxynaphthalene or tetrahydroxynaphthalene.

In one preferred embodiment, the naphthalene epoxy is derived from dihydroxynaphthalene Specific dihydroxynaphthalene precursors which may be used for producing the naphthalene epoxy include, for example, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 2,3-dihydroxynaphthalene, and 2,7-dihydroxynaphthalene. In another preferred embodiment, the naphthalene epoxy is represented by the formula

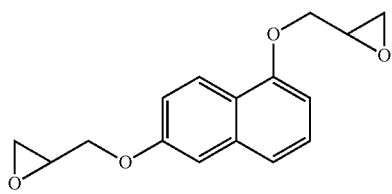

which is commercially available from Huntsman Advanced Materials LLC as Araldite® MY 816 epoxy.

Optionally, the halogen-free thermosetting composition may also include at least one of a solvent, a catalyst, a flame retardant and fillers.

Examples of solvents useful in the thermosetting composition include, but are not limited to, methylethylketone, acetone, N-methyl-2-pyrrolidone, N,N-dimethyl formamide, pentanol, butanol, dioxolane, isopropanol, methoxy propanol, methoxy propanol acetate, dimethylformamide, glycols, glycol acetates, toluene and xylene and mixtures thereof. The thermosetting composition may include from about 5-30 parts by weight of the solvent, per 100 parts by weight of the halogen-free thermosetting composition.

Examples of catalysts include, but are not limited to, thiodipropionic acid, phenols, thiodiphenol benzoxazine, sulfonyl benzoxazine, sulfonyl and diphenol. The thermosetting composition may include from about 0.001-15 parts by weight of the catalyst, per 100 parts by weight of the halogen-free thermosetting composition.

Examples of flame retardants include, but are not limited to, phosphorus flame retardants such as DOPO (9,10-dihydro-9-oxa-phosphaphenanthrene-10-oxide), Fyroflex® PMP flame retardant (a reactive organophosphorus additive modified with hydroxyl groups at its chain ends), CN2645A (a material based on phosphine oxide and containing phenolic functionality available from Great Lakes Chemical Corp.), Exolit flame retardants (available from Clariant), and ferrocene. The thermosetting composition may include from about 0.1-50 parts by weight of the flame retardant, per 100 parts by weight of the halogen-free thermosetting composition.

Examples of fillers include, but are not limited to, ammonium polyphosphates, plasticizers, inorganic and organic phosphorus containing compounds, micro hollow spheres and metal powders. The thermosetting composition may include from about 0.001-10 parts by weight of fillers, per 100 parts by weight of the halogen-free thermosetting composition.

The halogen-free thermosetting composition of the present disclosure may be prepared in known manner, for example, by mixing the components together in any order using customary devices, such as a stirred vessel, stirring rod, ball mill, sample mixer, static mixer or ribbon blender. In one embodiment, the composition is formulated in such a manner that the weight ratio of the benzoxazine compound of formula (I) plus the monobenzoxazine monomer of formula (II) to the naphthalene epoxy is about 15:85 to about 85:15. In another embodiment, the halogen free thermosetting composition is formulated so that the weight ratio of the benzoxazine compound of formula (I) plus the monobenzoxazine monomer of formula (II) to the naphthalene epoxy is about 25:75 to about 75:25. In yet another embodiment, the halogen free thermosetting composition is formulated so that the weight ratio of the benzoxazine compound of formula (I) plus the monobenzoxazine monomer of formula (II) to the naphthalene epoxy is about 50:50. According to another embodiment, the halogen-free thermosetting composition of the present disclosure is prepared by mixing together from about 5-50 parts by weight of the benzoxazine compound of formula (I), from about 5-50 parts by weight of the monobenzoxazine monomer of formula (II), and from about 1-50 parts by weight of the naphthalene epoxy, per 100 parts by weight of the halogen-free thermosetting composition. Once formulated, the composition may be packaged in a variety of containers such as steel, tin, aluminium, plastic, glass or cardboard containers.

The halogen-free thermosetting composition may be applied to a substrate and cured at temperatures greater than about 80° C. By thermally curing the halogen-free thermosetting composition of the present disclosure at temperatures greater than about 80° C., preferably at a temperature greater than about 90° C. to less than about 150° C., an inflammable composite article may be obtained by techniques well known in the industry, for example, pultrusion, infusion, molding, encapsulating or coating. Thus, according to another embodiment, the halogen-free thermosetting composition of the present disclosure may be used in methods for manufacturing flame retarded composite articles, such as castings, prepregs, bonding sheets, laminates and metal-foil clad laminates. As used herein, "flame retarded" means meeting the UL 94 standard criterion V0.

The properties of the flame retarded composite articles can be tailored for certain applications by the addition of reinforcement fibers. Examples of reinforcement fibers include glass, quartz, carbon, alumina, ceramic, metallic, aramid, natural fibers (e.g. flax, jute, sisal, hemp), paper, acrylic and polyethylene fibers and mixtures thereof. The reinforcement fibers may be in any of various modes, for example, as a strand or roving formed by paralleling continuous fibers or discontinuous fibers (short fibers) in one direction, cloth such as woven fabric or mat, braids, unidirectional, bi-directional, random, pseudo-isotropic or three-dimensionally dispersed mat-like material, heterogeneous lattice or mesh material, and three-dimensional material such as triaxially woven fabric.

Thus, in another aspect, there is provided a method for producing a flame retarded composite article including the steps of: (i) providing a layer or bundle of reinforcement fibers; (ii) providing the halogen-free thermosetting composition; (iii) contacting the reinforcement fibers with the halogen-free thermosetting composition to coat and/or impregnate the reinforcement fibers; and (iv) curing the coated and/or impregnated reinforcement fibers at a temperature of least about 80° C.

Coating and/or impregnation may be effected by either a wet method or hot melt method. In the wet method, the halogen-free thermosetting composition is first dissolved in a solvent to lower viscosity, after which coating and/or impregnation of the reinforcement fibers is effected and the solvent evaporated off using an oven or the like. In the hot melt method, coating and/or impregnation may be effected by directly coating and/or impregnating the reinforcement fibers with the thermosetting composition which has been heated to reduce its viscosity, or alternatively, a coated film of the thermosetting composition may first be produced on release paper or the like, and the film placed on one or both sides of the reinforcement fibers and heat and pressure applied to effect coating and/or impregnation of the composition. The hot melt method is preferred since there is no residual solvent.

According to another aspect, there is provided a method for producing a flame retarded composite article in a RTM system. The process includes the steps of: a) introducing a fiber preform comprising reinforcement fibers into a mold; b) injecting the halogen-free thermosetting composition into the mold, c) allowing the thermosetting composition to impregnate the fiber preform; and d) heating the resin impregnated preform at a temperature of least about 80° C., preferably at least about 90° C. to about 150° C. for a period of time to produce an at least partially cured solid article; and e) optionally subjecting the partially cured solid article to post curing operations to produce the flame retarded composite article.

In an alternative embodiment, the present disclosure provides a method for forming a flame retarded composite article in a VaRTM system. The process includes the steps of a) introducing a fiber preform comprising reinforcement fibers into a mold; b) injecting the halogen-free thermosetting composition into the mold; c) reducing the pressure within the mold; d) maintaining the mold at about the reduced pressure; e) allowing the thermosetting composition to impregnate the fiber preform; and f) heating the resin impregnated preform at a temperature of at least about 80° C., preferably at least about 90° C. to about 150° C. for a period of time to produce an at least partially cured solid article; and e) optionally subjecting the at least partially cured solid article to post curing operations to produce the flame retarded composite article.

Besides RTM and VaRTM systems, the thermosetting composition may be used in other methods and systems for producing flame retarded composite articles including hot-pressing of prepregs, sheet molding compound, molding, laminating, casting, pultrusion and filament winding.

In still another embodiment, the halogen-free thermosetting composition, upon curing at a temperature between about 90° C. to about 150° C., provides a cured composite article having a glass transition temperature greater than 120° C., preferably greater than 160° C., most preferably greater than 180° C., and especially preferably greater than 200° C.

In still another embodiment, the present disclosure provides a halogen-free thermosetting composition comprising:
(a) 5-50 parts by weight of a benzoxazine compound of the formula (I)

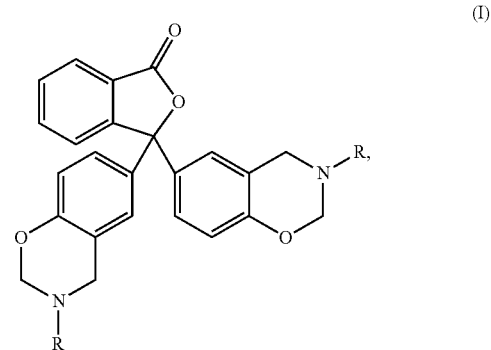

wherein each R is, independently from one another, allyl, unsubstituted or substituted phenyl, unsubstituted or substituted $C_1$-$C_8$ alkyl or unsubstituted or substituted $C_3$-$C_8$ cycloalkyl;
(b) 5-50 parts by weight of a monobenzoxazine monomer of the formula (II)

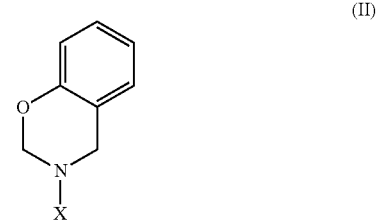

wherein X is an aliphatic or aromatic group; and
(c) 1-50 parts by weight of a naphthalene epoxy
per 100 parts by weight of the halogen-free thermosetting composition wherein the halogen-free thermosetting composition, upon curing, has a glass transition temperature greater than 160° C., preferably greater than 180° C., and more preferably greater than 200° C.

The composite articles may be used in various applications, for example, in aerospace applications, where they may be employed as aircraft primary structural materials (main wings, tail wing, floor beam, etc), secondary structural materials (flap, aileron, cowl, fairing, interior trim, etc), rocket motor cases, structural materials for artificial satellites, and the like. In addition, they may be employed as structural materials for moving bodies such as cars, boats and railway carriages, drive shafts, plate springs, wind turbine blades, pressure vessels, fly-wheels, papermaking rollers, civil engineering and building materials (roofing materials, cables, reinforcing bars, retrofitting materials) and the like.

Examples

A) Solvent Based Halogen-Free Thermosetting Composition

The following components in Table 1 were added to a container and sufficiently mixed to homogeneity at room temperature:

TABLE 1

| Component | Example 1 | Example 2 | Example 3 | Example 4 |
|---|---|---|---|---|
| Methylethylketone | 30 | 27 | 28.4 | 20 |
| Phenolphthalein Benzoxazine | 58.3 | 52.4 | 45.5 | 18 |
| Monophenol Benzoxazine | | | | 34 |
| Naphthalene Epoxy | | | | 15 |
| Tetra Ethane Epoxy | 6.3 | 5.7 | 4.9 | |
| Ferrocene | 5.4 | 4.9 | 4.2 | |
| TDP Catalyst* | | | 7 | 5 |
| PPA catalyst | | 10 | 10 | 8 |

* Available commercially from Huntsman Advanced Materials LLC as DT-300

The handling (Neat properties) were tested per TA Instruments Q2000 DSC (10° C. min. to 350° scan) and ASTM D-2393 (viscosity). Solvent based prepreg was made using the above formulations and Volan A 10 oz. glass cloth. Material was then B-staged per Table 2. Ten layers were then press cured 1 Hr/140° C. (hot-in/hot-out). The cured laminate (Composite Properties) included were DMA Tg tested per ASTM D-4065 (5° C./min. to 350° C. scan) and flammability tested per UL 94 and provided the following properties:

TABLE 2

| Property | Example 1 | Example 2 | Example 3 | Example 4 |
|---|---|---|---|---|
| Handling Neat Properties | | | | |
| DSC Onset (° C.) | 217 | 175 | 161 | 151 |
| DSC Peak (° C.) | 243 | 217 | 205 | 180 |
| Viscosity @ 25° C. | 1200 | 900 | 930 | 200 |
| One week viscosity @ 25° C. | 1200 | 920 | 935 | 290 |
| Composite Properties | | | | |
| DMA $T_g$ 1 hr/140° C. Press Cure Only | | | 99.3 | 90.4 |
| Press Cure + 1 hr at 140° C. | | | 122.5 | 111.9 |
| Press Cure + 1 hr at 160° C. | | | 158.4 | 133.2 |
| Press Cure + 1 hr at 180° C. | | | 175.1 | 141.2 |
| Press Cure + 1 hr at 200° C. | | | 186.2 | 144.6 |
| Flame Testing – UL 94 | V0 | V0 | V0 | V0 |
| B Staging | 5 min. at 171° C. | 5 min at 171° C. | 1 min at 140° C. | 1 min at 140° C. |
| Tack | No | No | Fair | Very good |
| Drape | No | No | Fair | Very good |

Although making and using various embodiments of the present disclosure have been described in detail above, it should be appreciated that the present disclosure provides many applicable inventive concepts that can be embodied in a wide variety of specific contexts. The specific embodiments discussed herein are merely illustrative of specific ways to make and use the disclosure, and do not delimit the scope of the disclosure.

What is claimed is:
1. A halogen-free thermosetting composition comprising:
(a) 15-30 parts by weight of a benzoxazine compound of the formula (I)

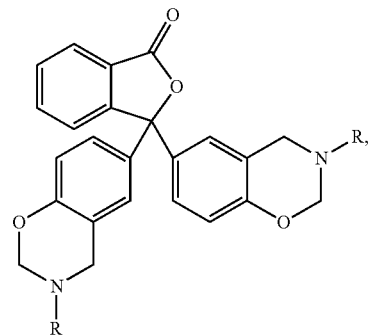

(I)

wherein each R is, independently from one another, allyl, unsubstituted or substituted phenyl, unsubstituted or substituted $C_1$-$C_8$ alkyl or unsubstituted or substituted $C_3$-$C_3$ cycloalkyl;

(b) a monobenzoxazine monomer of the formula (II)

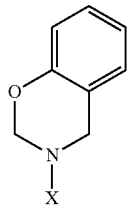

wherein X is monophenol, a $C_1$-$C_8$ alkyl group or a $C_3$-$C_8$ cycloalkyl group; and (c) a naphthalene epoxy where parts by weight are based on 100 parts by weight of the halogen-free thermosetting composition and wherein the halogen-free thermosetting composition, upon heating at a temperature greater than 90° C. to less than 150° C., is thermally cured.

2. The halogen-free thermosetting composition according to claim 1 wherein each R is phenyl.

3. The halogen-free thermosetting composition according to claim 2 wherein X is monophenol.

4. The halogen-free thermosetting composition according to claim 1 wherein the naphthalene epoxy is a compound represented by the formula

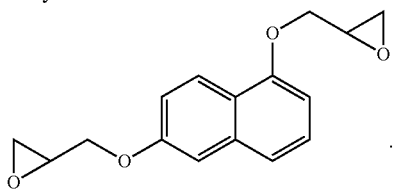

5. The halogen-free thermosetting composition according to claim 1 further comprising at least one of a solvent, a catalyst, a flame retardant and fillers.

6. The halogen-free thermosetting composition according to claim 5 wherein the solvent is selected from the group consisting of methylethylketone, acetone, N-methyl-2-pyrrolidone, N,N-dimethyl formamide, pentanol, butanol, dioxolane, isopropanol, methoxy propanol, methoxy propanol acetate, dimethylformamide, glycol, glycol acetate, toluene, xylene and mixtures thereof.

7. A halogen-free thermosetting composition comprising:
(a) 15-30 parts by weight of a benzoxazine compound of the formula (I)

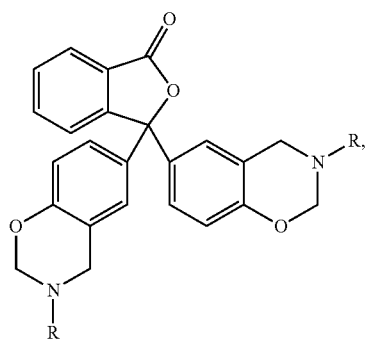

wherein each R is, independently from one another, allyl, unsubstituted or substituted phenyl, unsubstituted or substituted $C_1$-$C_8$-alkyl or unsubstituted or substituted $C_3$-$C_8$ cycloalkyl;

(b) 5-50 parts by weight of a monobenzoxazine monomer of the formula (II)

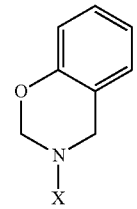

wherein X is monophenol, a $C_1$-$C_8$ alkyl group or a $C_3$-$C_8$ cycloalkyl group; and (c) 10-20 parts by weight of a naphthalene epoxy where parts by weight are based on 100 parts by weight of the halogen-free thermosetting composition, and wherein the halogen-free thermosetting composition, upon curing at a temperature greater than 90° C. to less than 150° C., has a glass transition temperature greater than 160° C.

8. The halogen-free thermosetting composition according to claim 7, wherein the glass transition temperature is greater than 180° C.

9. A halogen-free thermosetting composition produced according to a method comprising mixing together:
(a) 15-30 parts by weight of a benzoxazine monomer of the formula (I)

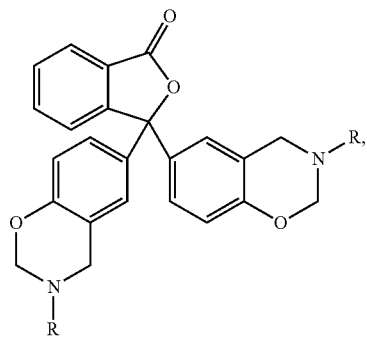

wherein each R is, independently from one another, allyl, unsubstituted or substituted phenyl, unsubstituted or substituted $C_1$-$C_8$ alkyl or unsubstituted or substituted $C_3$-$C_8$ cycloalkyl;

(b) 5-50 parts by weigh of a monobenzoxazine monomer of the formula (II)

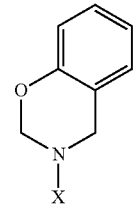

wherein X is monophenol, a $C_1$-$C_8$ alkyl group or a $C_3$-$C_8$ cycloalkyl group; and (c) 10-20 parts by weight of a naphthalene epoxy where parts by weight are based on 100 parts by weight of the halogen-free thermosetting composition.

\* \* \* \* \*

UNITED STATES PATENT AND TRADEMARK OFFICE
CERTIFICATE OF CORRECTION

PATENT NO. : 8,912,259 B2  
APPLICATION NO. : 13/816952  
DATED : December 16, 2014  
INVENTOR(S) : James Hoge Page 1 of 1

It is certified that error appears in the above-identified patent and that said Letters Patent is hereby corrected as shown below:

Claims  
Column 10; Line 67: In Claim 1, delete "$C_3$-$C_3$" and insert -- $C_3$-$C_8$ --

Signed and Sealed this  
Twenty-fourth Day of May, 2016

Michelle K. Lee  
*Director of the United States Patent and Trademark Office*